Figures 1, 2:
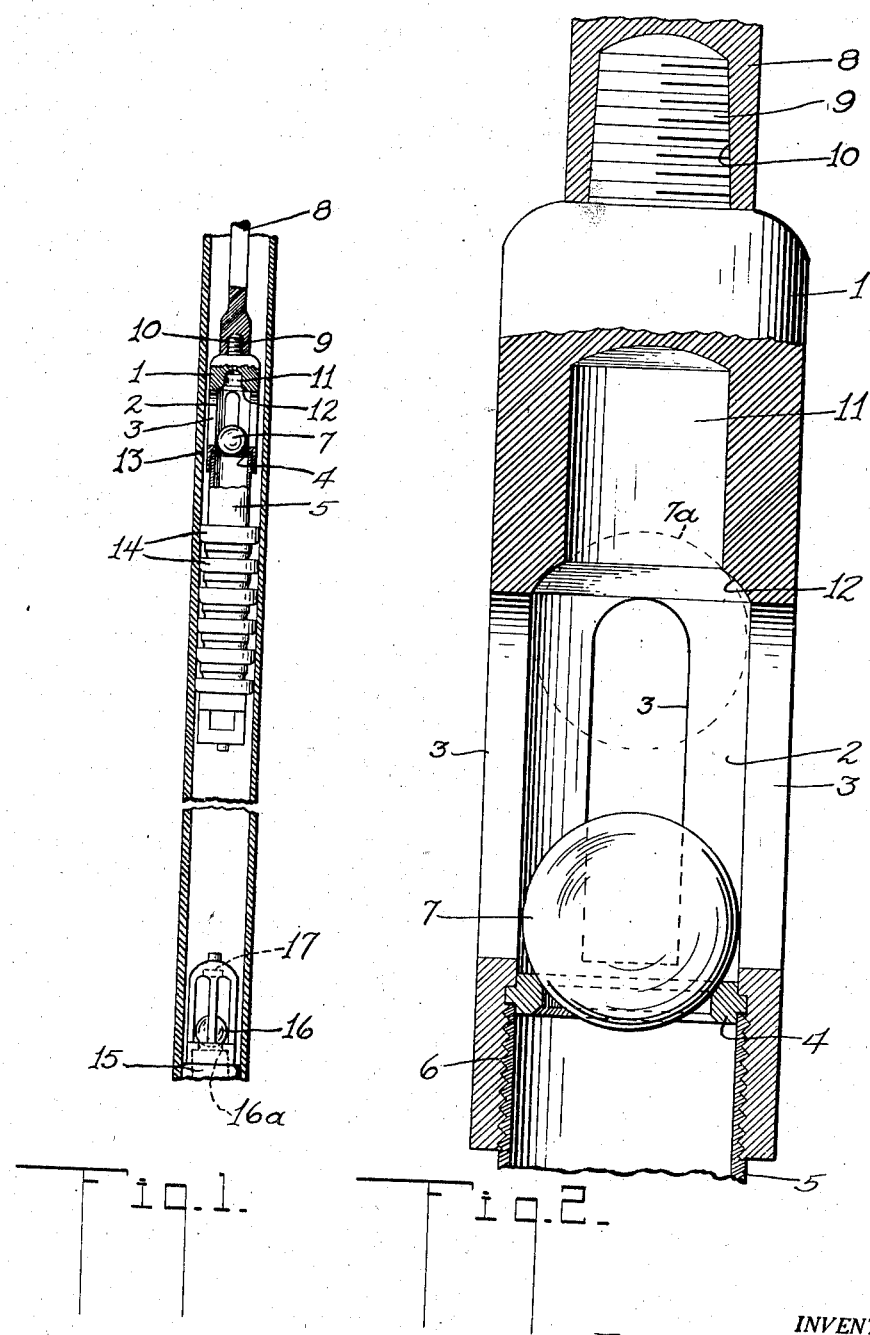

June 11, 1940.   E. G. WARE   2,203,759
PUMP VALVE WITH GAS CHAMBER IN CAGE
Filed Aug. 27, 1938

INVENTOR.
ELMER G. WARE
BY
ATTORNEYS.

Patented June 11, 1940

2,203,759

UNITED STATES PATENT OFFICE 2,203,759

PUMP VALVE WITH GAS CHAMBER IN CAGE

Elmer G. Ware, Bakersfield, Calif.

Application August 27, 1938, Serial No. 227,162

1 Claim. (Cl. 103—225)

My invention relates to improvements in a pump valve with gas chamber in cage, and it consists of the combinations, constructions and arrangements hereinafter described and claimed.

In the pumping of oil, the metal ball valve strikes a metal seat when moving from open position to closed position. On the down stroke of the pump rods, the ball valve carried by the cage attached to the rods is moved upwardly by the column of oil as the oil passes the valve seat. The ball valve is generally raised to a point where it will contact with the top of the ball passageway. Just prior to the start of the up stroke of the pump rods, the ball valve will seat abruptly due to the weight of the column of oil above it. The heavy force of the seating impact has a tendency to cause the ball and seat to wear excessively or chip.

The principal object of my invention is to provide a gas chamber at the top of the ball passageway for accelerating the initial movement of the ball toward the valve seat and acting as a gas cushioning chamber for lessening the shock of the ball at the instant of seating in much the same manner as the air chamber functions on a reciprocating pump.

A further object of my invention is to provide a device of the type described which is simple in construction and is durable and efficient for the purpose intended.

Other objects and advantages will appear in the following specification, and the novel features of the device will be particularly pointed out in the appended claim.

My invention is illustrated in the accompanying drawing forming a part of this application, in which Figure 1 is a vertical section through an oil well tubing showing the pump cage with the gas chamber; and Figure 2 is an enlarged sectional view of a portion of the pump cage.

In carrying out my invention, I provide a pump cage indicated at 1 and this cage has a ball guideway 2 therein. The wall of the passageway is provided with openings or windows 3 through which oil can pass. A ball valve seat 4 is placed in the cage 1 just below the window openings and this seat is held in place by the top of a pump plunger or cup assembly 5 that is screwed into a threaded portion 6 in the lower end of the cage. A ball valve 7 normally rests on the seat 4 and may be lifted into the dotted line position shown at 7a when the cage 1 is moved downwardly by the pump rods 8. The cage has a threaded shank 9 receivable in a threaded portion 10 of the rods 8.

The parts thus far described, form no part of my invention, except insofar as they cooperate with my invention as now to be described. The cage 1 has a gas chamber 11 formed at the top of the ball passageway or guideway 2 and this chamber has an outwardly flared entrance opening 12 toward which the ball 7 moves when in raised position. In Figure 1 I show the pump rods 8 operatively mounted in a pump body 13. The pump plunger or cup assembly 5 is carried by the cage 1 and is shown supporting a plurality of cups 14 of standard construction. The cups move along the inner surface of the pump body 13 in the usual manner. A standing ball valve cage 15 is shown secured to the pump body 13 and a second ball valve 16 is mounted in this cage. This cage has a gas chamber 17 similar to the gas chamber 11.

From the foregoing description of the various parts of the device, the operation thereof may be readily understood.

The pump rods 8 are reciprocated in the usual manner by a power mechanism not shown, and on the down stroke the ball valve 16 will close and the ball 7 will be raised due to the fact that oil is trapped in the pump body 13 above the ball valve 16. On the up stroke, the ball valve 7 should immediately seat and this will cause the oil above the valve to be trapped and lifted. A partial vacuum will be formed in the portion of the pump body 13 disposed below the valve 7 and this will open the valve 16 and will draw a fresh supply of oil above the lower valve. Oil will sometimes pass the valve 16 under its own pressure and in such instances this will aid the partial vacuum to deliver oil into the pump body.

The difficulty with this type of operation is that the ball valve 7 will seat immediately prior to the up stroke and in seating will deliver a hammer-like blow due to the descending weight of the fluid column above the valve. This will cause undue wear or chipping between the ball and the valve seat and may even cause the ball or valve seat to break. With the gas chamber 11, the ball will be initially started toward the valve seat by the gas due to its pressure and lower viscosity. Furthermore, at the instant of seating of the ball, the blow normally caused by the oil column acting on the ball will be cushioned because the oil will tend to flow into the gas chamber to compress the gas and the gas in the chamber will cushion the impact in much the same manner as the functioning of an air chamber in a reciprocating pump. The gas chamber 17 in the cage 15 acts in the same manner. The gas will continually fill both recesses 11 and 17 because the recesses will be constantly replenished by the gas escaping from the oil flowing through the pump.

It is to be undestood that the term oil is to be considered broad enough to include any fluid body.

The seat 4 may be provided with an insert (not shown) of a hard metal alloy to resist wear. The seat 16a for the ball valve 16 may be likewise provided with a hard metal insert.

While I have shown only the preferred form of my invention, it should be understood that various changes or modifications may be made within the scope of the appended claim without departing from the spirit of the invention.

I claim:

In combination with the barrel of a pump, a cage located in said barrel, said cage being internally bored to provide a ball guideway and slotted in the wall resulting from the bore for the passage of fluid, said cage being counterbored from the upper end of the internal bore to provide a closed-ended surge chamber and being flared at its entrance to form a valve seat at the upper end of the guideway, a complemental seat carried by the cage at the lower end of the guideway, and a ball valve constituting the sole occupant of the guideway, being movable therein but directly subject to restriction in one of its seating movements by the diversion of the fluid into the surge chamber when said valve is in the action of seating on the lower seat.

ELMER G. WARE.